(12) United States Patent
Cheung et al.

(10) Patent No.: US 8,096,599 B2
(45) Date of Patent: Jan. 17, 2012

(54) STOWABLE TABLE UNIT SYSTEM FOR A VEHICLE

(75) Inventors: Timothy Cheung, Cupertino, CA (US);
Katherine Fu, Arlington, VA (US);
Jason Jura, Forest Hill, MD (US);
Nikhil Kaushal, Pittsburgh, PA (US);
Gaku Sato, North Hollywood, CA (US);
Peter Theis, Sewickley, PA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 222 days.

(21) Appl. No.: 12/473,775

(22) Filed: May 28, 2009

(65) Prior Publication Data

US 2009/0293774 A1 Dec. 3, 2009

Related U.S. Application Data

(60) Provisional application No. 61/057,947, filed on Jun. 2, 2008.

(51) Int. Cl.
*B60P 3/00* (2006.01)
(52) U.S. Cl. .................................................... 296/24.3
(58) Field of Classification Search ................. 296/24.3; 108/143, 44, 115, 13, 42; 297/145, 162, 297/14, 144; 280/651
See application file for complete search history.

(56) References Cited

U.S. PATENT DOCUMENTS

| | | | | |
|---|---|---|---|---|
| 1,604,837 A * | 10/1926 | Morden | ............................. | 5/118 |
| 1,809,866 A * | 6/1931 | Riesche | ........................... | 108/38 |
| 1,916,537 A * | 7/1933 | Smith | ................................ | 108/8 |
| 2,316,710 A * | 4/1943 | Parke | ............................. | 105/315 |
| 2,588,785 A * | 3/1952 | Will | ................................... | 5/10.2 |
| 2,844,428 A * | 7/1958 | Puntenney | ...................... | 108/23 |
| 3,282,566 A * | 11/1966 | Clarke | ........................... | 254/122 |
| 3,391,960 A * | 7/1968 | Megargle et al. | ............ | 296/24.3 |
| 3,574,388 A * | 4/1971 | Stone | ............................. | 296/168 |
| 3,606,846 A * | 9/1971 | Andrews et al. | .............. | 108/132 |
| 3,866,547 A * | 2/1975 | Guyton | ........................... | 108/38 |
| 4,032,770 A * | 6/1977 | Millette | ......................... | 362/127 |
| 4,058,860 A * | 11/1977 | Daidone | .......................... | 5/10.1 |
| 4,313,385 A * | 2/1982 | Fitzgerald | ...................... | 108/38 |
| 4,341,418 A | 7/1982 | Chappell | | |
| 4,607,577 A * | 8/1986 | Leonardo | ...................... | 108/146 |
| 4,803,930 A * | 2/1989 | Crocoli | ........................... | 108/48 |
| 4,827,851 A | 5/1989 | Diffrient | | |
| 4,922,836 A * | 5/1990 | Damico | ......................... | 108/146 |
| 4,940,003 A | 7/1990 | Mayhew | | |
| 5,016,846 A * | 5/1991 | Solomon | ....................... | 248/161 |
| 5,129,611 A * | 7/1992 | Grover et al. | ................. | 248/688 |
| 5,197,779 A | 3/1993 | Mizuno | | |
| 5,279,233 A | 1/1994 | Cox | | |
| 5,377,787 A * | 1/1995 | Chabrier | ....................... | 187/404 |
| 5,408,940 A * | 4/1995 | Winchell | ...................... | 108/147 |
| 5,528,997 A | 6/1996 | Miller | | |

(Continued)

*Primary Examiner* — Kiran B. Patel
(74) *Attorney, Agent, or Firm* — Jeffrey P. Calfa; Mark C. Bach; Gerald W. Askew

(57) ABSTRACT

A stowable table unit system for a motor vehicle comprises a table portion, a support leg portion, and a lifting mechanism. The table portion has a top surface and a bottom surface. The lifting mechanism connects to the table portion and positions the table portion between a stowed position and a deployed position. The support leg moves between a stored position within the bottom surface of the table portion when the table portion is in the stowed position and an extended position when the table portion is in the deployed position.

10 Claims, 9 Drawing Sheets

U.S. PATENT DOCUMENTS

| | | | |
|---|---|---|---|
| 5,588,697 A * | 12/1996 | Yoshida et al. | 297/173 |
| 5,638,761 A * | 6/1997 | Berkowitz et al. | 108/132 |
| 5,673,628 A | 10/1997 | Boos | |
| 5,694,860 A * | 12/1997 | Xiao | 108/38 |
| 5,758,586 A * | 6/1998 | Kieser et al. | 108/147 |
| 5,762,398 A | 6/1998 | Gonzalez | |
| 5,803,325 A | 9/1998 | Wang | |
| 5,865,128 A * | 2/1999 | Tarnay | 108/133 |
| 6,109,189 A * | 8/2000 | Tarver | 108/48 |
| 6,163,900 A * | 12/2000 | Stevenson | 5/118 |
| 6,224,127 B1 | 5/2001 | Hodge | |
| 6,604,471 B1 * | 8/2003 | Tarver, Jr. | 108/40 |
| 6,969,198 B2 | 11/2005 | Konishi | |
| 7,073,217 B2 * | 7/2006 | Stevenson | 5/118 |
| 7,090,104 B2 | 8/2006 | Dorety | |
| 7,143,701 B2 | 12/2006 | Lindstrom | |
| 7,197,988 B2 * | 4/2007 | Degen et al. | 108/26 |
| 7,258,400 B2 | 8/2007 | Yamada | |
| 7,278,681 B2 | 10/2007 | Lilov | |
| 7,280,898 B2 | 10/2007 | Lesesky | |
| 7,285,034 B2 | 10/2007 | Kay | |
| 7,314,242 B2 | 1/2008 | Masunaga | |
| 7,328,930 B2 | 2/2008 | Aufrere | |
| 7,721,657 B2 * | 5/2010 | Carstensen | 108/40 |
| 7,726,669 B2 * | 6/2010 | Alexander | 280/47.19 |
| 7,744,142 B2 * | 6/2010 | Rasmussen | 296/24.3 |
| 2005/0239586 A1 * | 10/2005 | Nebel | 474/58 |
| 2006/0066131 A1 * | 3/2006 | Nebel | 296/156 |
| 2006/0103180 A1 * | 5/2006 | Brown | 297/162 |
| 2007/0226901 A1 * | 10/2007 | Pervorse et al. | 5/118 |

* cited by examiner

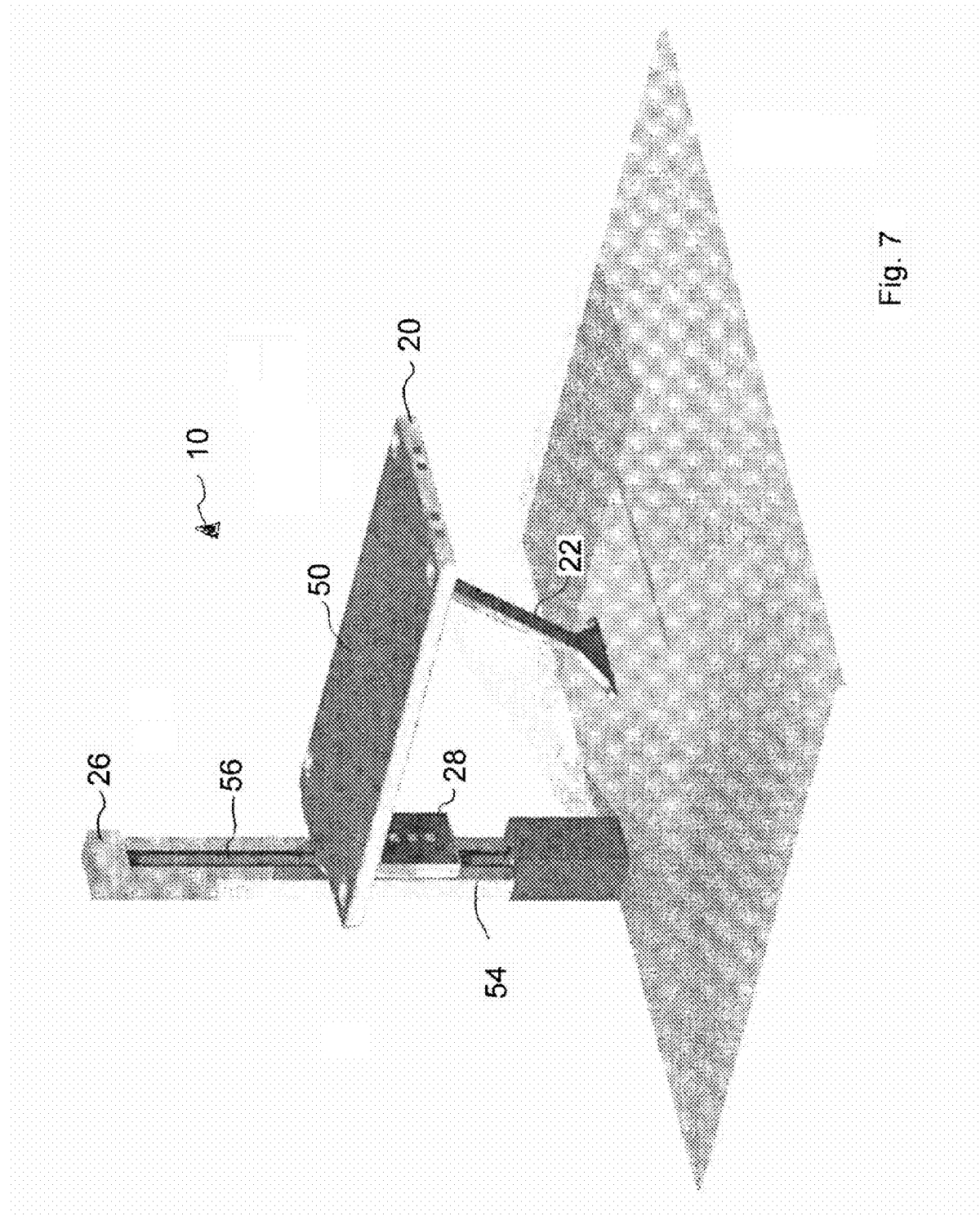

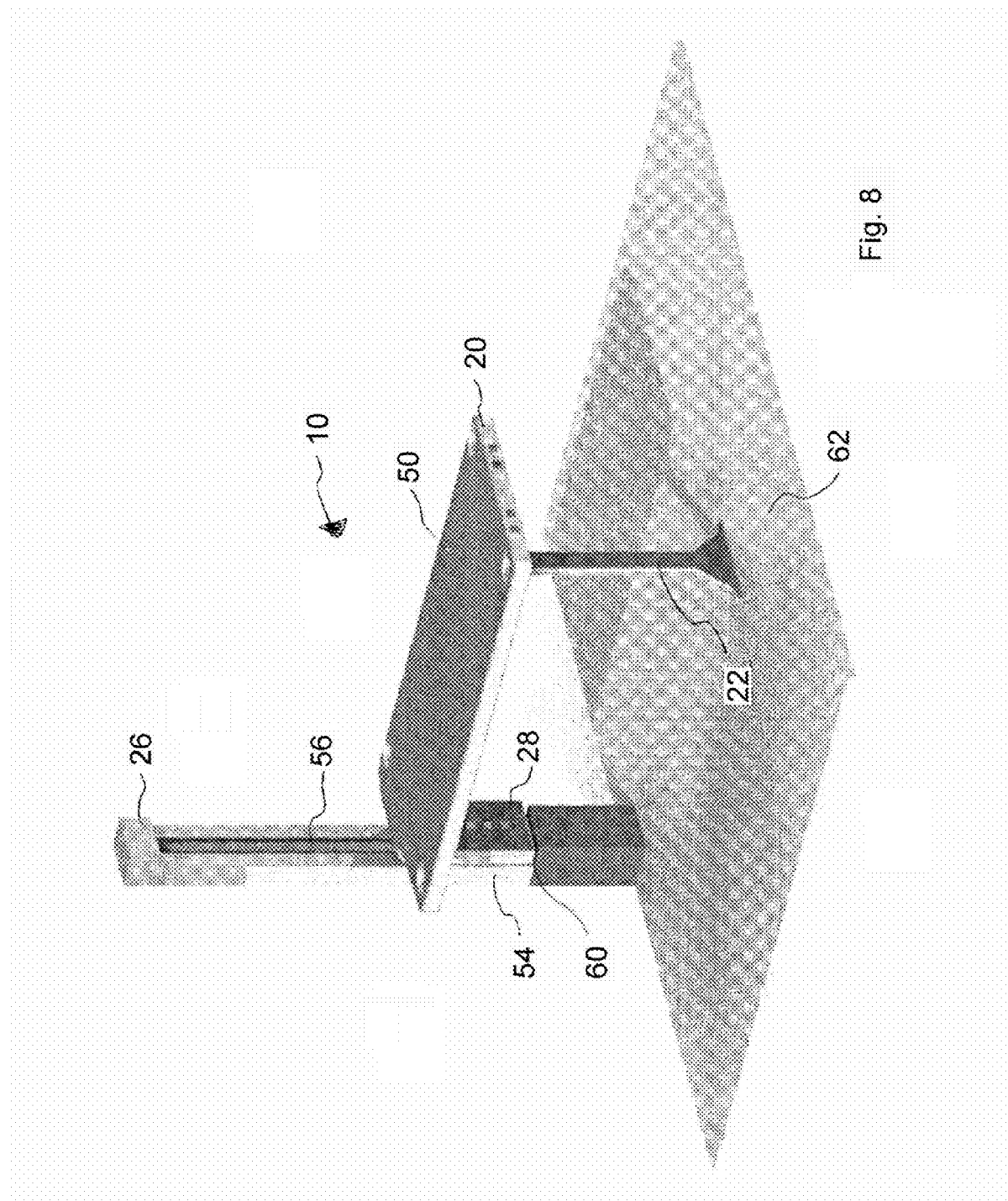

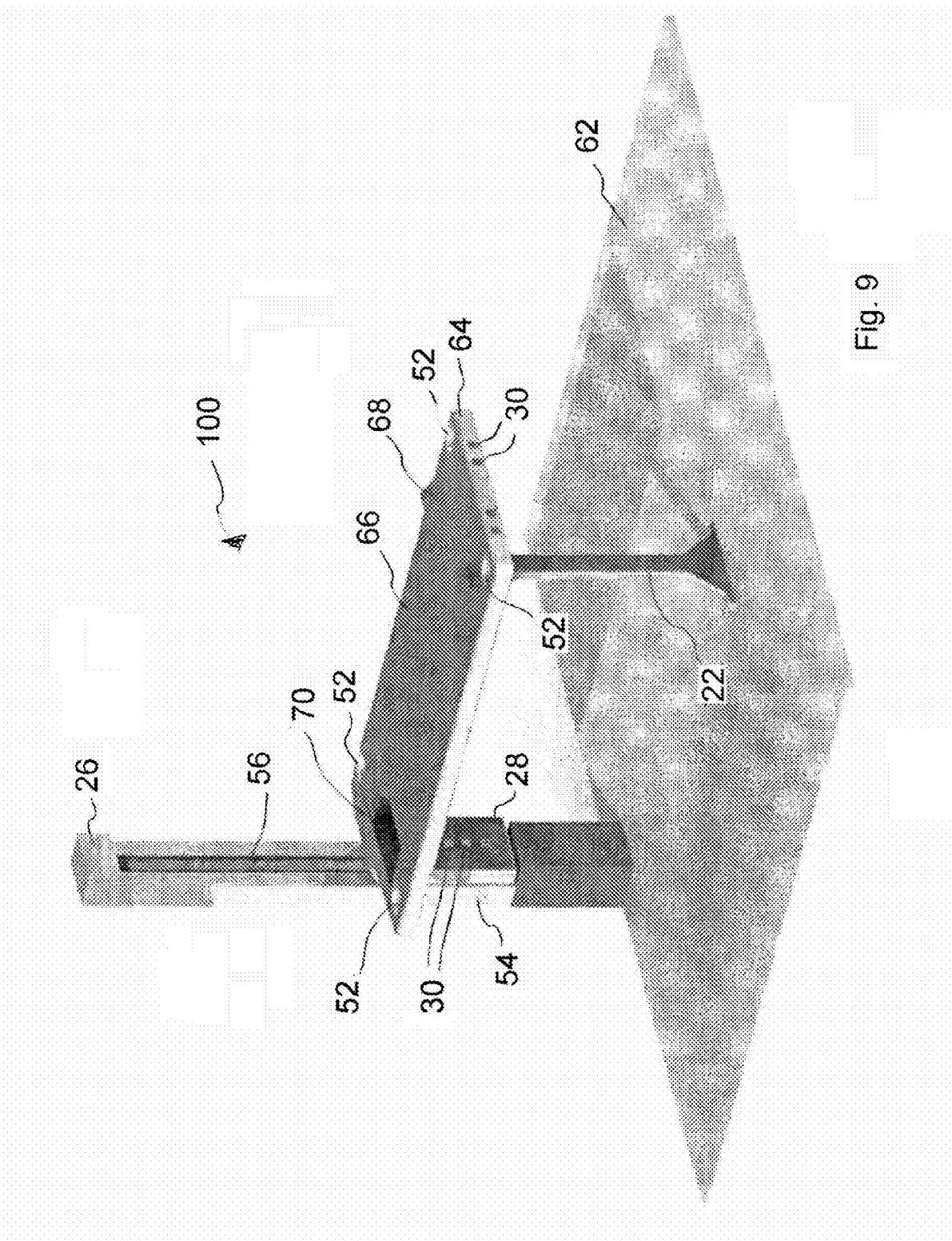

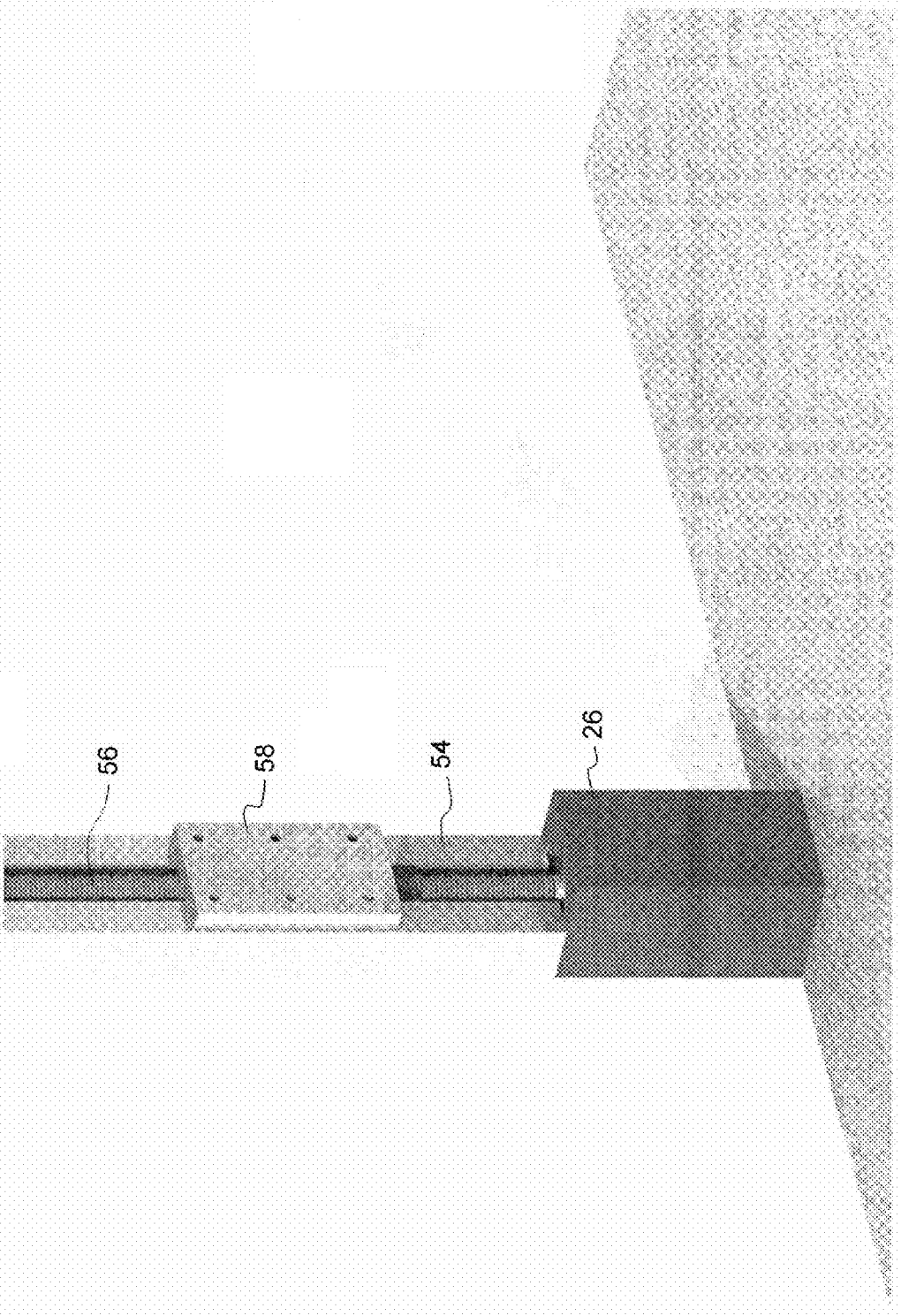

STOWABLE TABLE UNIT SYSTEM FOR A VEHICLE

CROSS REFERENCE TO RELATED APPLICATION

This application claims priority from provisional U.S. application Ser. No. 61/057,947, filed Jun. 2, 2008 and entitled TeamUP, the teachings of which are incorporated by reference herein in their entirety.

TECHNICAL FIELD

A working table unit for a motor vehicle, and more particularly a stowable table unit system for a motor vehicle is provided herein.

BACKGROUND

Motor vehicles, particularly trucks, are increasingly used as multipurpose vehicles. Accordingly, such motor vehicles are used to transport passengers, personal items, and business items. While the needs of a particular user may differ depending on occasion, and from one user to another, many people who utilize trucks for business purposes often need a location for meetings at a worksite. In some industries, such as construction, an office trailer may be provided on certain projects, however, an office trailer increases expenses for the project, and may not always be conveniently located on a large work site. Thus, there is a need to provide a stowable table unit for a motor vehicle that may be deployed when a table surface is needed, but stows away when not in use.

SUMMARY

According to one embodiment, a stowable table unit system for a motor vehicle comprises a table portion, a support leg portion, and a lifting mechanism. The table portion has a top surface and a bottom surface. The lifting mechanism connects to the table portion and positions the table portion between a stowed position and a deployed position. The support leg moves between a stored position within the bottom surface of the table portion when the table portion is in the stowed position and an extended position when the table portion is in the deployed position.

According to another embodiment, a lifting mechanism for a stowable table unit system for a vehicle that has a table portion is provided. The lifting mechanism comprises a motor powered threaded rod and B-pillar bracket. The B-pillar bracket attaches to the motor powered threaded rod. The B-pillar bracket moves based on rotation of the motor powered threaded rod. The B-pillar bracket additionally connects to the table portion of the stowable table unit system. The B-pillar bracket is positioned adjacent a B-pillar of the vehicle.

A method of operating a stowable table unit system for a vehicle is also provided. The stowable table unit system comprises a table portion that has a mounting bracket and a support leg portion. The support leg portion has an actuator. The stowable table unit system additionally comprises a lifting mechanism that has a B-pillar bracket attached to a motor powered threaded rod. The mounting bracket of the table portion attaches to the B-pillar bracket of the lifting mechanism. The motor powered threaded rod rotates in a first direction. The B-pillar bracket and table portion move from a stowed position towards a deployed position via the rotation of the motor powered threaded rod in the first direction and the attachment of the B-pillar bracket to the mounting bracket of the table portion. The actuator deploys the support leg portion by rotating the support leg portion from a stored position to an extended position.

BRIEF DESCRIPTION OF THE DRAWINGS

FIG. 7 is a detailed perspective view of the stowable table unit system of FIG. 1 in a third partially deployed position;

FIG. 8 is a detailed perspective view of the stowable table unit system of FIG. 1 in a fully deployed position; and FIG. 9 is a detailed perspective view of a stowable table unit system according to another embodiment in a fully deployed position.

FIG. 10 is a detailed perspective view of a B-pillar lifting mechanism including a motor powered threaded rod and a B-pillar bracket according to another embodiment.

Figure 1:
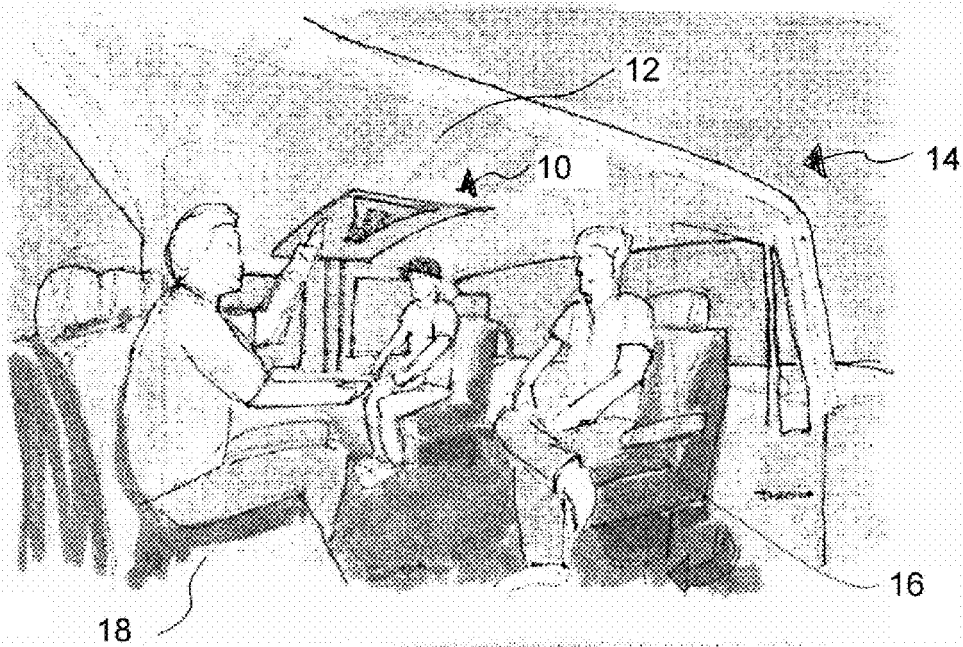
FIG. 1 is a perspective view of a stowable table unit system in a stowed position.

DESCRIPTION OF REFERENCE NUMERALS 10. stowable table unit system
12. ceiling
14. vehicle
16. front seats
18. rear seats
20. table portion
22. support leg portion
24. bottom surface
26. B-pillar
28. mounting bracket
30. plurality of electrical outlets
32. first support member
34a. second support member
34b. third support member
36a. first cross member
36b. second cross member
38a. third cross member
38b. fourth cross member
40. actuator
42. linkage
44. first bracket
46. second bracket
48. rod
50. top surface
52. plurality of cup holders
54. lifting mechanism
56. motor powered threaded rod
58. B-pillar bracket
59. top ledge
60. bottom ledge
62. floor
64. table portion
66. top surface
68. first storage unit
70. second storage unit
100. stowable table unit system

DETAILED DESCRIPTION

Figure 2:
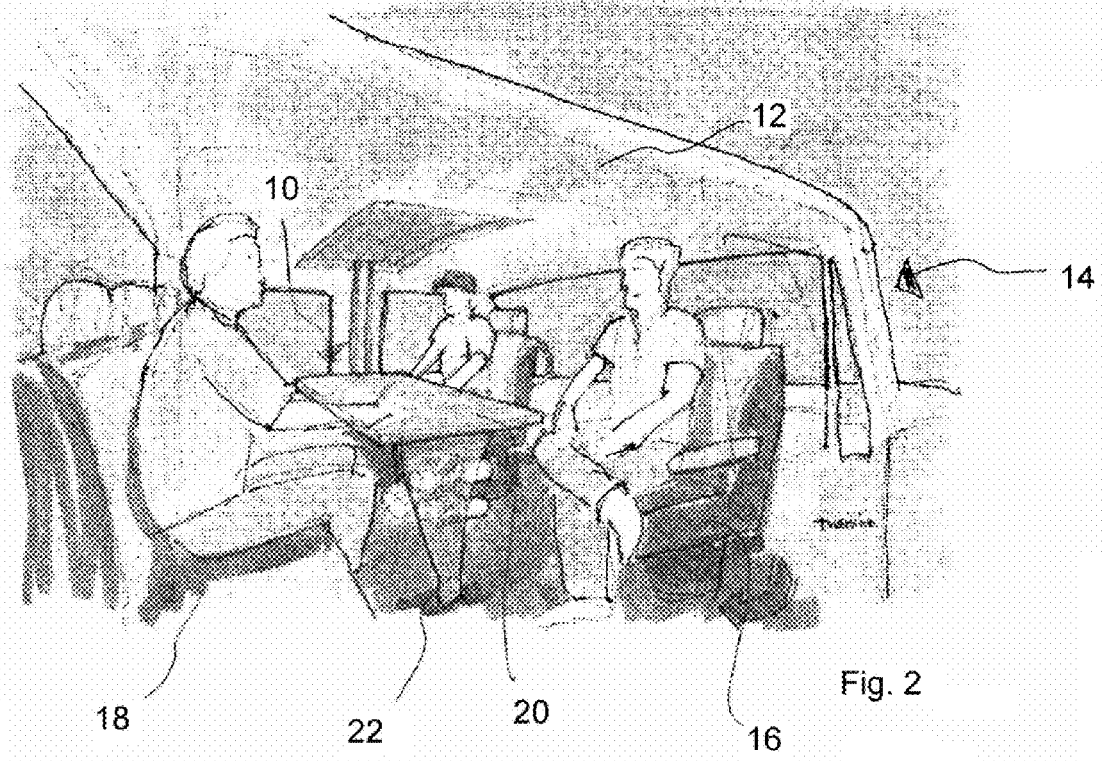
FIG. 2 is a perspective view of the stowable table unit system of FIG. 1 in a deployed position.

One embodiment of a stowable table unit system 10 is shown in FIGS. 1-8. As shown in FIG. 1, the stowable table unit system 10 is in a stowed position in a ceiling 12 of a vehicle 14. The vehicle 14 has front seats 16 and rear seats 18. The front seats 16 are adapted to be rotated about one hundred eighty degrees (180°) to face the rear seats 18. FIG. 2 shows the stowable table unit system 10 in a deployed position within the vehicle 14. As shown in FIG. 2 the stowable table unit system 10 deploys to a position between the front seats 16 and the rear seats 18. The stowable table unit system 10 generally includes a table portion 20 and a support leg portion 22.

Figure 3:
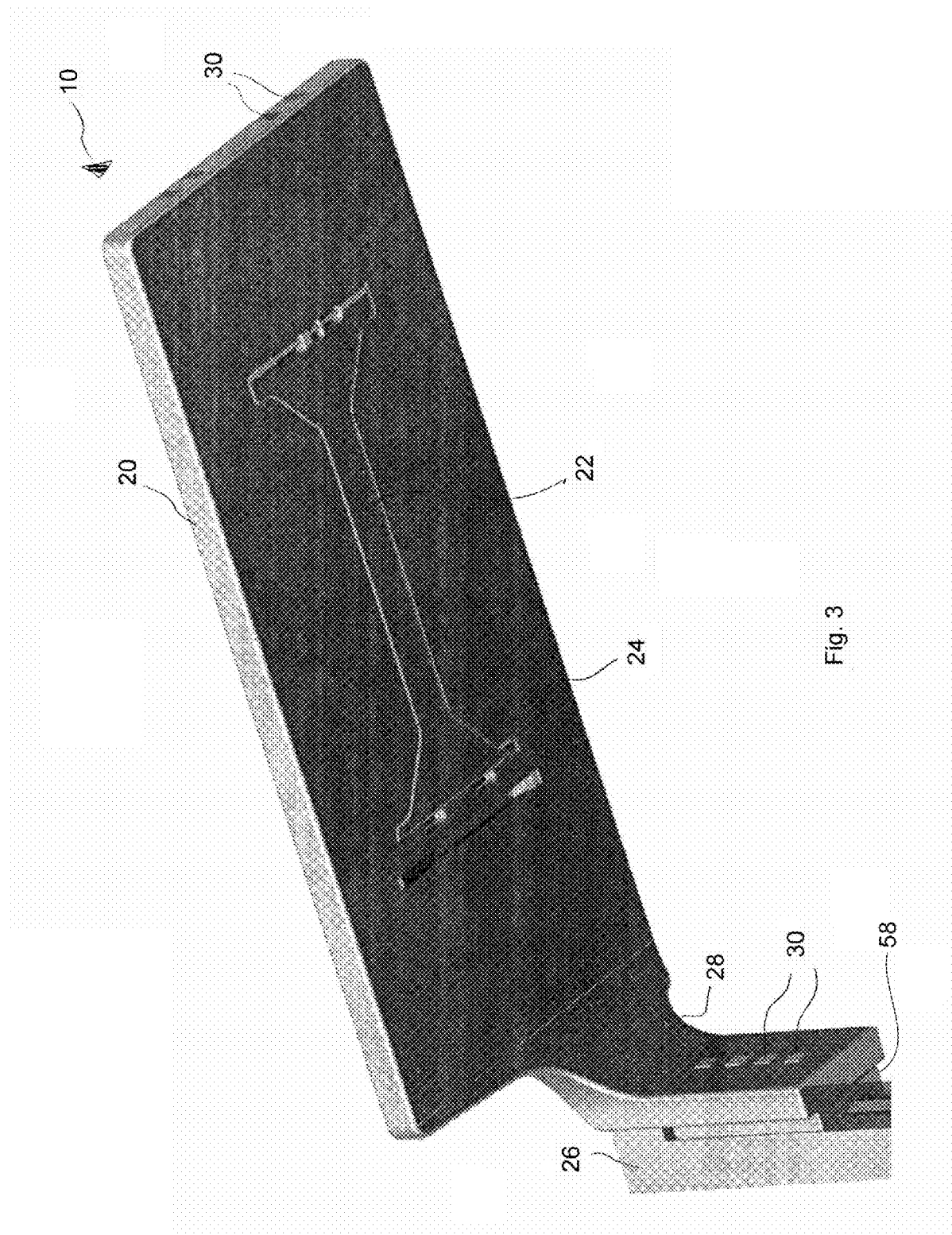
FIG. 3 is a detailed perspective view of the stowable table unit system of FIG. 1 in the stowed position.

As shown in FIG. 3, the support leg portion 22 is adapted to store within a bottom surface 24 of the table portion 20 when the stowable table unit system is in a stowed position. The table portion 20 mounts to a B-pillar 26 of the vehicle 14 via a mounting bracket 28 of the table portion 20. A plurality of electrical outlets 30 are located proximate the mounting bracket 28 on the stowable table unit system 10, while an additional plurality of electrical outlets 30 are located on the table portion 20 at an end of the table portion 20 opposite the mounting bracket 28. The electrical outlets 30 may be connected to an electrical system of the vehicle 14 to provide electrical power for accessories such as computers, battery chargers, lights, or other accessories. When the support leg portion 22 of the stowable table unit system 10 is stowed within the table portion 20, a generally flush surface is formed by the leg portion 22 and the bottom surface 24 of the table portion 20.

Figure 4:
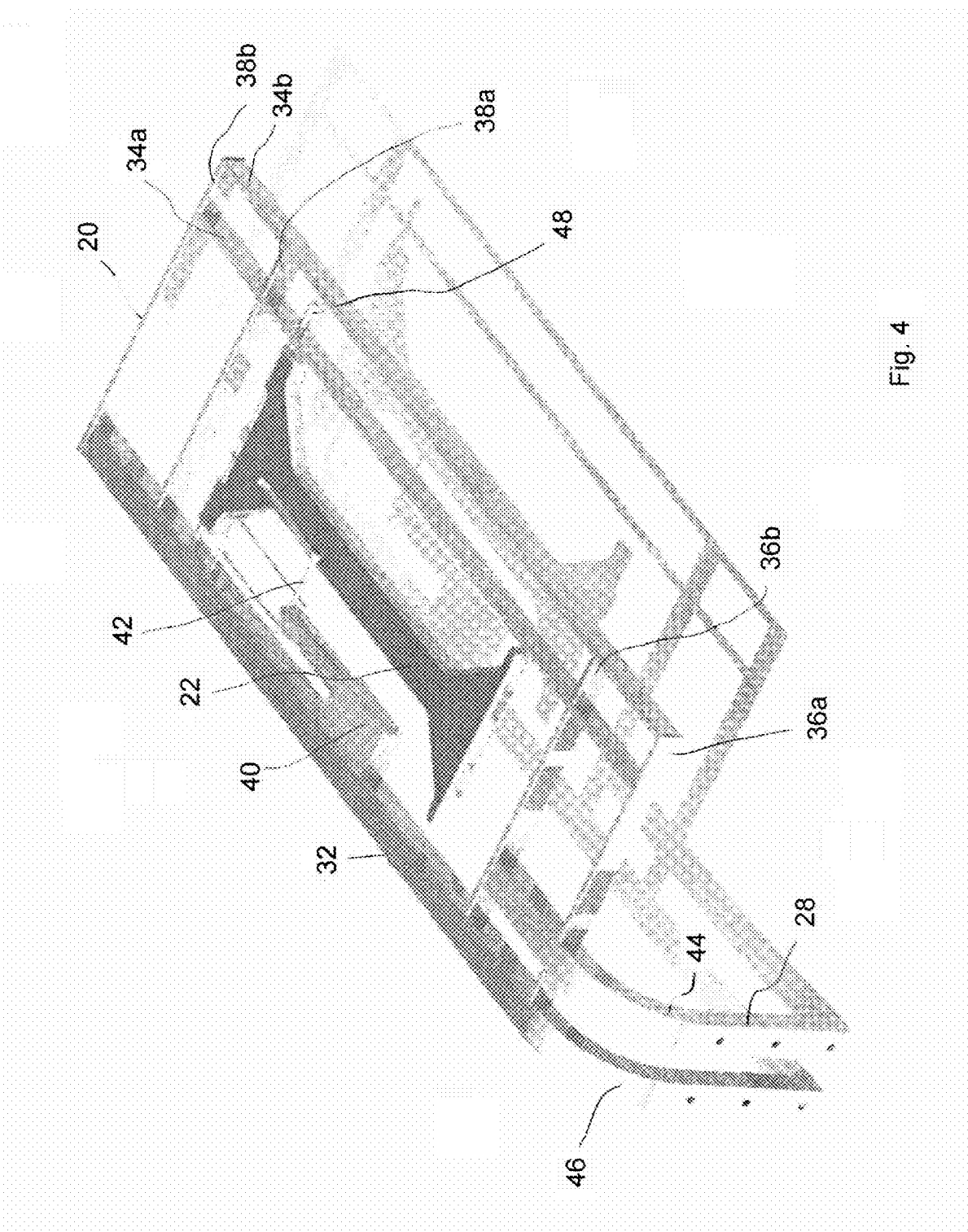
FIG. 4 is a detailed perspective view of a support frame of the stowable table unit of FIG. 1 in the stowed position.

Turning now to FIG. 4, a frame of the stowable table unit system 10 is shown. The table portion 20 has a first support member 32 located at a first side of the table portion 20 and second and third support members 34a, 34b located at a second side of the table portion 20. The first, second and third support members 32, 34a, 34b extend along a first direction of the table portion 20. A first cross member 36a and a second cross member 36b extend between the first support member 32 and the second and third support members 34a, 34b at a first edge of the table portion. A third cross member 38a and a fourth cross member 38b extend between the first support member 32 and the second and third support members 34a, 34b at a second edge of the table portion. The first and second cross members 36a, 36b and the third and fourth cross members 38a, 38b are generally perpendicular to the first, second, and third support members 32, 34a, 34b.

The mounting bracket portion 28 of the stowable table unit system 10 comprises a first bracket 44 and a second bracket 46. The first bracket 44 connects to the first and second cross members 36a, 36b. The second bracket 46 may run the length of the table portion 20, thus connecting to not only the first and second cross members 36a, 36b, but also to the third and fourth cross members 38a, 38b. It is contemplated that the second bracket 46 may form the first support member 32.

The first and second brackets 44, 46 are generally rectangular steel tubes of standard dimensions, such as two inch by one and one-half inch (2"×1.5") tubing. The second and third support members 34a, 34b, and the cross members 36a, 36b, 38a, 38b are generally rectangular steel plate of standard dimensions, such as one and one-half inch by half inch (1.5"× 0.5") plate. Although steel, such as 1035 steel, may be used to form the brackets 44, 46 and support and cross members 34a, 34b, 36a, 36b, 38a, 38b, it is contemplated that other materials, such as aluminum, titanium, alloys of steel, other metals, or polymeric materials may be used.

Also shown in FIG. 4 is an actuator 40 for operating a linkage 42 that deploys the support leg portion 22 of the stowable table unit system 10. According to one embodiment, the actuator 40 is a linear actuator that connects to the linkage 42 in manner such that, as the actuator extends, the leg portion rotates from a stored position within the bottom surface 24 of the table portion to an extended position, such as shown in FIG. 2. The support leg portion 22 pivots about a rod 48 that connects to the first support member 32 and the second support member 34a. Similarly, retracting the actuator 40 attached to the linkage 42 causes the leg portion 22 to pivot about the rod 48 towards the stored position form the extended position.

Figure 5:
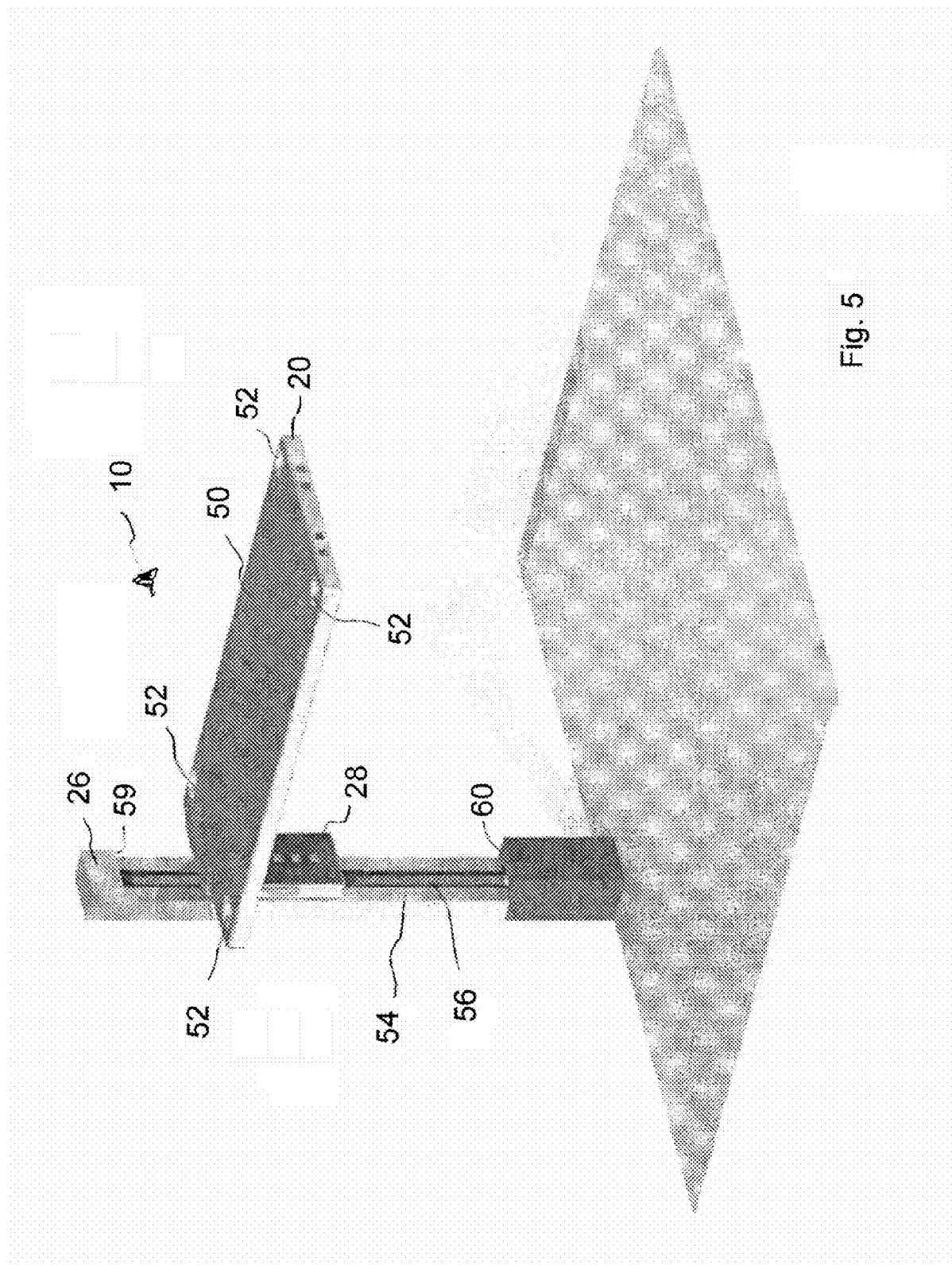
FIG. 5 is a detailed perspective view of the stowable table unit system of FIG. 1 in a first partially deployed position.

Turning now to FIGS. 5-8, the stowable table unit system 10 is shown being moved from the stowed position to the deployed position. As shown in FIG. 5, the stowable table unit system 10 is in a first partially deployed position. The table portion 20 has been lowered from the vehicle ceiling (not shown), but the support leg portion 22 has not yet begun to deploy. A top surface 50 of the table portion 20 may be seen clearly in FIG. 5. The top surface 50 of the table portion has a plurality of cup holders 52 formed therein. The cup holders 52 are sized to receive a beverage container, such as a drink cup or soda can, such that the beverage container is less likely to be spilled onto the top surface 50 of the table portion 20.

A B-pillar 26 lifting mechanism 54 is also partially shown in FIG. 5. The lifting mechanism 54 includes a motor powered threaded rod 56 and a B-pillar bracket 58 (FIG. 10). As shown in FIG. 10, the B-pillar bracket 58 threadably mounts to the motor powered threaded rod 56 to move up and down the B-pillar 26 of the vehicle depending on the direction of rotation of the motor powered threaded rod 56. Rotation of the motor powered threaded rod 56 in a first direction causes the B-pillar bracket 58 to move downward, towards a deployed position, while rotation of the motor powered threaded rod 56 in a second direction, generally opposite the first direction, causes the B-pillar bracket 58 to move upwards, towards a stowed position. The mounting bracket 28 of the table portion 20 is adapted to mount to the B-pillar bracket 58. Thus, the movement of the B-pillar bracket 58 along the powered threaded rod 56 moves the table portion 20 between the stowed position to the deployed position.

As shown in FIGS. 5-8 the lifting mechanism 54 has a top ledge 59 and a bottom ledge 60 that limit the movement of the table portion 20 of the stowable table unit system 10. The top ledge 59 is located proximate a top of the B-pillar 26 and is positioned such that the top surface 50 of the table portion 20 contacts the top ledge 59 when the table portion 20 is in the stowed position. Similarly, the bottom ledge 60 is disposed proximate a bottom of the B-pillar 26 and is positioned such that a lower surface of the mounting bracket 28 of the table portion 20 contacts the bottom ledge when the table portion 20 is in the deployed position.

Figure 6:
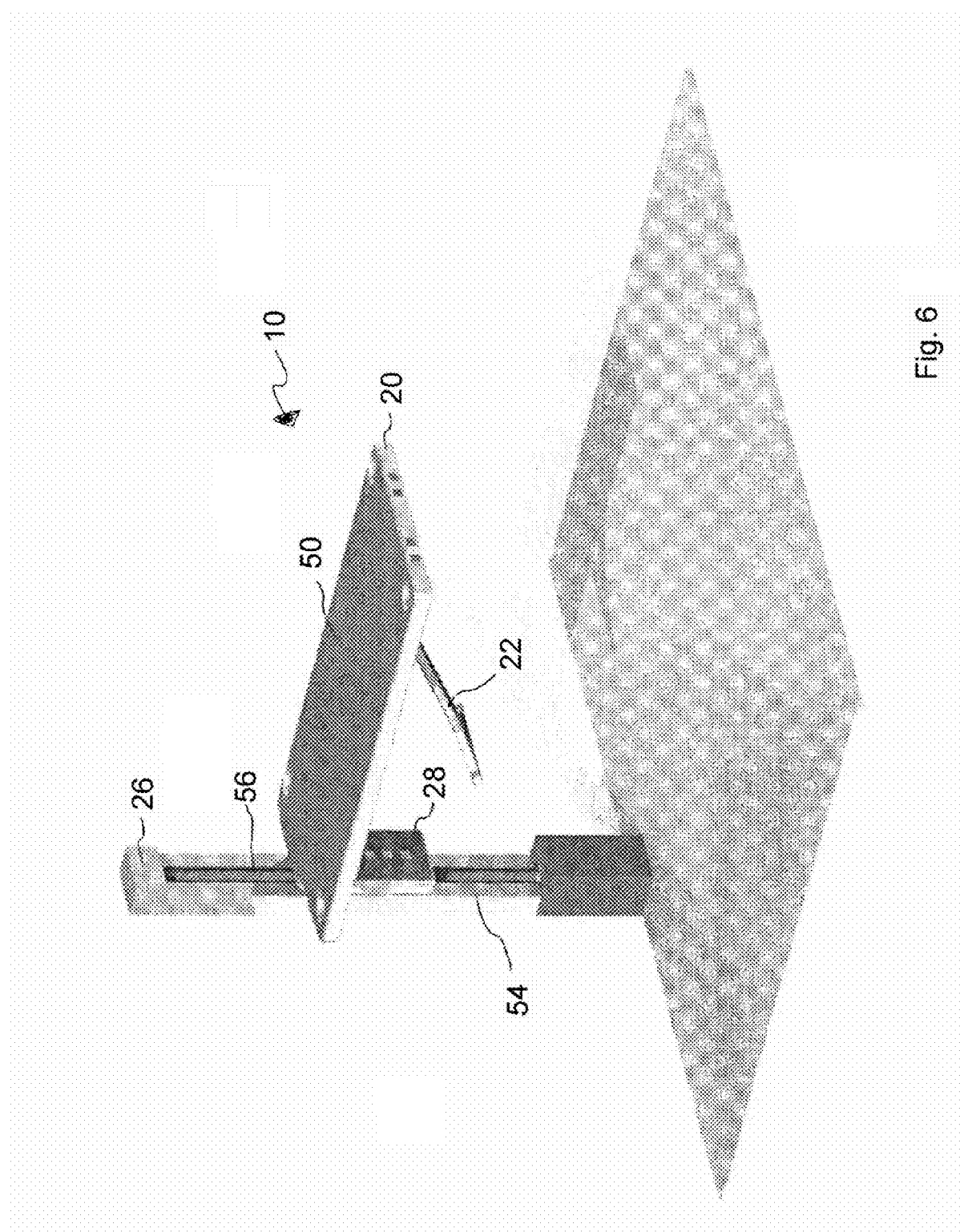
FIG. 6 is a detailed perspective view of the stowable table unit system of FIG. 1 in a second partially deployed position.

FIG. 6 depicts the support leg portion 22 beginning to deploy from the table portion 20. The table portion 20 has been lowered along the B-pillar 26 by the lifting mechanism 54 relative to the position of the table portion 20 depicted in FIG. 5. As previously discussed in connection with FIG. 4, the actuator 42 extends such that the linkage 42 is manipulated to cause the leg portion 22 to pivot about rod 48 and extend from the table portion 20.

Similarly, FIG. 7 shows the support leg portion 22 extending still further from the table portion 20. The table portion 20 has been lowered along the B-pillar 26 by the lifting mechanism 54 relative to the position of the table portion 20 depicted in FIG. 6.

Turning now to FIG. 8, the stowable table unit system 10 is shown in a completely deployed position. The mounting bracket 28 of the table portion 20 contacts the bottom ledge 60 of the B-pillar 26. Additionally, the leg portion 22 is fully extended and contacts a floor 62 of the vehicle. The leg portion 22 provides additional support while the table portion 20 of the stowable table unit system 10 is in a deployed position, allowing the table portion 20 to support loads likely to be seen in operational use, up to about several hundred pounds.

A variety of materials may be used to cover the frame of the table portion 20 of the stowable table unit system 10. It is contemplated that a thermoplastic be used to form the top surface 50 and bottom surface 24 of the table portion. An example of a thermoplastic may be a polycarbonate and acrylonitrile butadiene styrene blend (PC/ABS blend). Such a blend has thermal and mechanical properties of polycarbonate, and the production benefits of ABS. an example of PC/ABS blend that may be utilized is Bayer Corporation's Bayblend® KU 1-1446 product.

Turning now to FIG. 9, another embodiment of a stowable table unit system 100 is depicted. The stowable table unit system 100 is similar to the stowable table unit system 10 described above, and identical components share the same reference numbers as described above. The stowable table unit system 100 has a table portion 64. The table portion 64 mounts to a B-pillar 26 of the vehicle 14 via the mounting bracket 28. The table portion 64 is moveable from a stowed position to a deployed position via the lifting mechanism 54.

A plurality of electrical outlets 30 are located proximate the mounting bracket 28 on the stowable table unit system 100, while an additional plurality of electrical outlets 30 are located on the table portion 64 at an end of the table portion 64 opposite the mounting bracket 28. The electrical outlets 30 may be connected to an electrical system of the vehicle to provide electrical power for accessories such as computers, battery chargers, lights, or other accessories.

When the support leg portion 22 of the stowable table unit system 100 is stowed within the table portion 64, a generally flush surface is formed by the leg portion 22 and a bottom surface of the table portion 64.

The table portion 64 has a top surface 66. The top surface 66 has a plurality of cup holders 52 located at each corner of the top surface 66 of the table portion 64. The top surface 66 of the table portion 64 additionally has a first storage unit 68 and a second storage unit 70. The first and second storage units 68, 70 are adapted to store small items such as pens, pencils, markers, computer accessories, power cords, battery chargers, or other small items.

What is claimed is:

1. A stowable table unit system for a motor vehicle comprising:
   a table portion having a top surface and a bottom surface;
   a support leg portion having a powered actuator mechanism and a linkage attached to the support leg portion and to the actuator mechanism; and
   a lifting mechanism connecting to the table portion and positioning the table portion between a stowed position and a deployed position;
   the powered actuator mechanism being activated to reposition the linkage and the leg portion between a stored position within the bottom surface of the table portion when the table portion is in the stowed position and an extended position when the table portion is in the deployed position.

2. The stowable table unit system of claim 1, wherein the table portion has a mounting bracket portion connecting to the lifting mechanism.

3. The stowable table unit system of claim 2, wherein the mounting bracket portion has a plurality of electrical outlets.

4. The stowable table unit system of claim 1, wherein the lifting mechanism is located within a B-pillar of the vehicle.

5. The stowable table unit system of claim 1, wherein the lifting mechanism comprises a motor powered threaded rod and a B-pillar bracket attached to the motor powered threaded rod.

6. The stowable table unit system of claim 5, wherein the table portion has a mounting bracket portion connecting to the B-pillar bracket of the lifting mechanism.

7. The stowable table unit system of claim 1, wherein the top surface of the table portion has a plurality of cup holders.

8. The stowable table unit system of claim 1, wherein at least a portion of the table portion has a plurality of electrical outlets.

9. The stowable table unit system of claim 1, wherein the stowed position is located within a ceiling of the vehicle in the stowed position.

10. The stowable table unit system of claim 1, wherein the lifting mechanism has a top ledge and a bottom ledge, the top ledge and the bottom ledge of the lifting mechanism limiting the movement of the table portion.

* * * * *